United States Patent Office 3,421,859
Patented Jan. 14, 1969

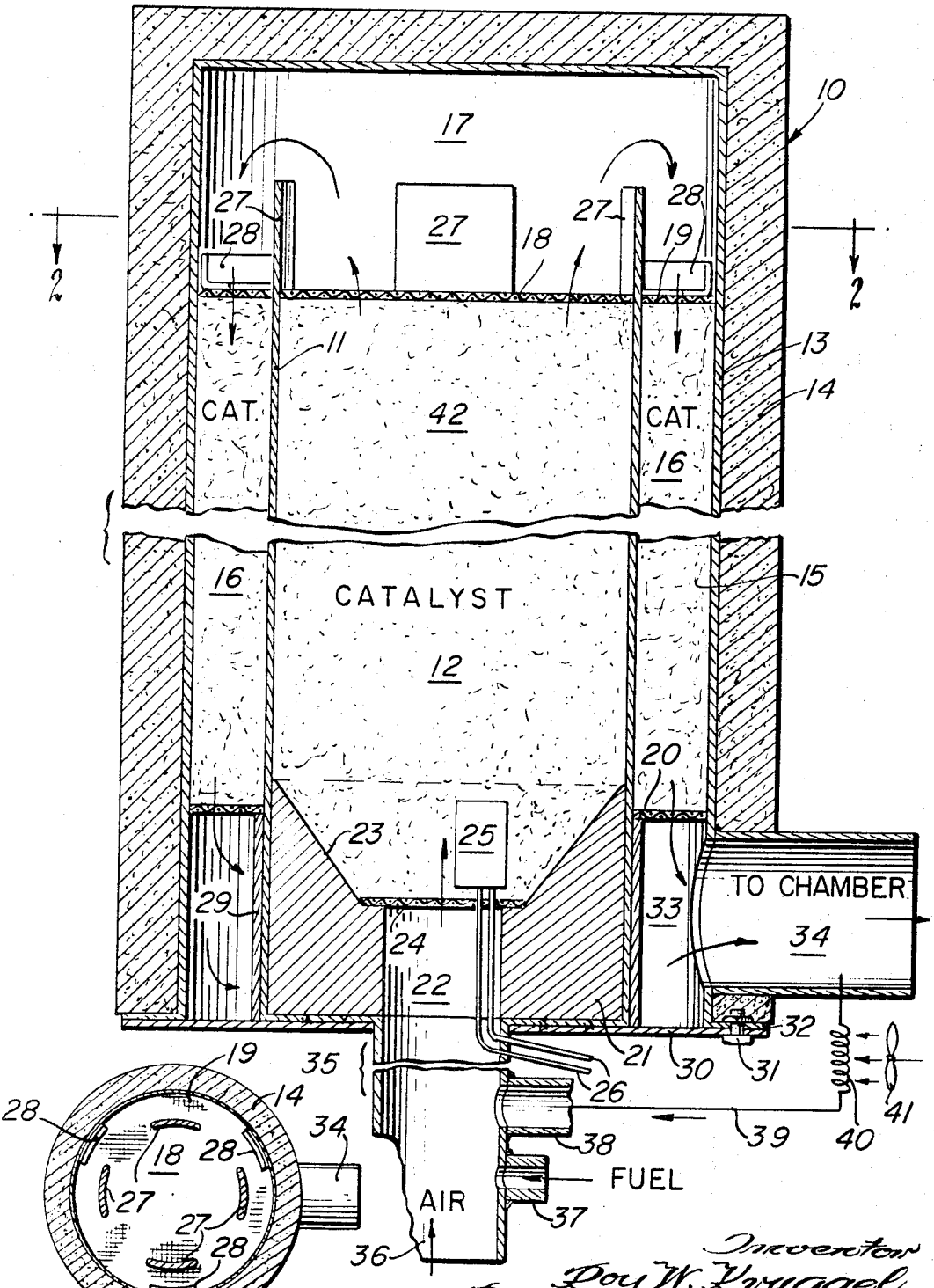

3,421,859
INERT ATMOSPHERE GENERATOR
Roy W. Kruggel, St. Joseph, Mich., assignor to Whirlpool Corporation, a corporation of Delaware
Filed Dec. 30, 1964, Ser. No. 422,210
U.S. Cl. 23—281                                                2 Claims
Int. Cl. B01j 7/00

ABSTRACT OF THE DISCLOSURE

A catalytic hydrocarbon fuel burner having a dual cylindrical catalyst bed whereby the two beds are spaced from each other but are in thermal contact so that the cool incoming air-fuel mixture flows through the first bed to cool the bed and preheat the mixture and then flows through the second bed to complete the burning of the mixture. The heat from the second catalyst bed flows to the cooler first bed thereby maintaining a predetermined temperature of the second bed while preheating the incoming mixture.

---

This invention relates to a catalytic generator for generating a reaction products atmosphere comprising carbon dioxide.

The generated atmosphere from the generator of this invention generally comprises carbon dioxide, oxygen and inert gases in controlled amounts that is useful for the preservation of animal and plant materials.

In the prior patents of Bedrosian et al., 3,102,778 and 3,102,780, there are disclosed apparatus and methods for providing such an atmosphere and for utilizing it for the preservation of animal and plant materials. These patents are assigned to the same assignee as the present application. An important element of the apparatus of the type disclosed in these prior patents is a catalytic generator including a catalyst bed in which a hydrocarbon fuel is burned in a controlled amount in the presence of air in a controlled amount to produce the atmosphere.

One of the features of this invention is to provide an improved catalytic reactor for generating a reaction products atmosphere comprising a container for a catalyst promoting the reaction of the hydrocarbon fuel in the presence of oxygen together with exit means from the container for the products of combustion and means for passing these combustion products in heat exchange relationship with the catalyst bed for simultaneously heating the catalyst in the bed, heating the incoming air-gas mixture by the heated catalyst and cooling the combustion products.

Other features and advantages of the invention will be apparent from the following description of one embodiment thereof taken in conjunction with the accompanying drawings. Of the drawings:

FIGURE 1 is a vertical sectional view substantially through the center of a catalytic reactor generator embodying the invention.

FIGURE 2 is a horizontal sectional view to a reduced scale taken along the line 2—2 of FIGURE 1.

The generator 10 shown in the accompanying drawings comprises a generally cylindrical container 11 arranged vertically and constructed of a heat conducting metal such as stainless steel. This container 11 is adapted to hold a primary catalyst bed 12 which is a standard granular catalyst of the type described in the above Bedrosian et al. patents and capable of promoting low temperature combustion of a hydrocarbon fuel in the presence of oxygen.

The container 11 is substantially concentrically located within a cylindrical metal shell 13 surrounded by heat insulation 14. The container 11 and the shell 13 are spaced apart to provide a chamber 15 therebetween also adapted to contain a granular catalyst bed 16 of the same type as in the bed 12 so that the catalyst bed 16 forms a secondary bed in thermal contact with the common wall or container 11.

The shell 13 extends above the container 11 to provide a space 17 communicating with the tops of both catalyst beds 12 and 16. It should be understood that space 17 could be filled with catalyst, if desired, without materially affecting the performance of the generator 10.

The top of the container 11 adjacent the top of the catalyst bed 12 is provided with a fluid permeable, catalyst retaining closure 18 in the form of a metal screen. The top of the chamber 15 is provided with an extension of screen 18 to provide a screen portion 19. The bottom of the chamber 15 is also provided with a closure screen 20 similar to the top screen portion 19.

The bottom of the container 11 is defined by a closure member 21 having a central vertical passage 22 and an upwardly and outwardly tapered throat 23 with the upper edge thereof being adjacent the inner surface of the container 11. The bottom of this throat 23 is provided with a closure member screen 24 extending thereacross for holding the catalyst 12.

Positioned in the catalyst 12 at the throat 23 is an electric resistance igniter 25 of the ordinary type powered from electric leads 26 also in the customary manner.

In order to retain the upper screen 18 in position the upper edge of the cylindrical container 11 is provided with spaced arcuate tongue portions 27 extending through correspondingly shaped openings in the screen 18. In the embodiment shown, there are four of these tongues 27 and they are arcuately aligned and substantially concentric with the container 11 and the shell 13.

In order to retain the screen 18 in position, there are provided spaced brackets 28 of right angle cross section spot welded to the inner surface of shell 13 and bearing against the top of the screen portions 19 located at the top of the secondary bed 16.

In order to support the bottom screen 20 there is provided a spacer cylinder 29 beneath the screen 20 and located against the outer surface of the bottom of the container 11. The bottom of this spaced cylinder 29 is supported on a bottom closure plate 30 that is bolted, as indicated at 31, to a radially extending flange 32 on the bottom of the outer shell 13.

The annular space 33 between the bottom screen 20 and the plate 30 is provided with an exhaust conduit 34 leading to a storage chamber for animal and plant materials, as discussed above, and as described in the Bedrosian et al. patents.

The inlet passage 22 beneath the central bottom screen 24 is connected to an inlet conduit 35 which forms a central extension of the bottom of the container 11. This conduit 35 is provided with a bottom entrance 36 for air as indicated, a side entrance 37 for gaseous hydrocarbon fuel and a side entrance 38 for recirculating a portion of the products of reaction back through the catalyst beds in the manner described and claimed in my copending application Ser. No. 415,617, filed Dec. 3, 1964 and assigned to the same assignee as the present application. As is described there, and as indicated diagrammatically here, a portion of the reaction gases are recirculated back into the generator by means of a recirculating line 39 containing a cooling means such as a coil 40 cooled by, for example, a fan as indicated at 41.

With the generator of this invention hydrocarbon fuel gas and air are forced up through the passage 22 into the bottom of the primary catalyst bed 12. Ignition is initiated by the igniter 25 until the burning within the bed 12 reaches a temperature at which burning will continue without the use of the igniter. The structure, function and operation of such an igniter in a catalyst bed is widely understood.

The products of combustion pass upwardly through the upper screen 18 into the space 17 and from there downwardly through the annular secondary catalyst bed 16 into the bottom space 33. From there, the carbon dioxide rich and oxygen poor combustion products pass through the exhaust conduit 34 to the storage chamber or other place of utilization.

Because the catalyst is firmly held on all sides, the system is quite resistant to shock and vibration. Thus, it is ideally suited for use on a vehicle during transportation of plant and animal materials such as on a truck, ship, airplane or the like. Furthermore, the generator of this invention is quite adaptable so far as size requirements are concerned, as it can be made as tall as desired or as large in diameter as desired to produce the necessary output of reaction products. In addition, the input velocity of the air, fuel and recirculated gases can be very large, as the passages into, through and from the generator are large.

A very important advantage of the generator of this invention is the providing of the catalyst bed in two parts, the primary bed 12 and the secondary bed 16. With this arrangement, substantially the entire catalytic burning takes place in the principal or primary bed 12. Then, the combustion products pass downwardly through the screen portion 19 and the secondary bed 16. Here, any remaining unreacted fuel is further reacted and, in addition, the hot gases forced down through the annular chamber 15 heat the primary catalyst bed 12 because of the common heat conducting wall 11 between the beds 12 and 16. This, of course, not only heats the catalyst bed 12 but also heats the incoming gases from passage 22 and cools the reaction gases exiting through the exhaust conduit 34.

Although, in the generator design shown in FIGURE 1 the annulus 15 is filled with catalyst and serves as a secondary reaction zone, the primary purpose of the annular region 15 is to transfer heat from the exit gases back to the primary catalyst bed 12 and the incoming air-gas mixture. This heat transfer from the exit gases to the primary bed 12 and the incoming gases could be effected by fins (not shown) attached to the outer surface of container 11 or heat transfer media in space 15. However, by using catalyst in space 15 the additional benefit of the secondary reaction zone is provided.

Although the igniter 25 is located adjacent the bottom of the catalyst bed 12, it is desired that the primary reaction zone 42 be located near the top of the catalyst bed 12. This is accomplished by providing a volumetric flow of mixed air, fuel and recirculated gas from the line 39 at such a rate that the reaction, although initiated at the bottom of the bed 12, is actually maintained at its peak rate in the primary reaction zone 42 near the top of the bed.

This is preferred so that the gases exiting through the top screen 18 and entering the top of the chamber 15 will be at substantially their highest temperature for greater efficiency in transferring heat from the gases to the catalyst in chamber 15 which in turn heats the catalyst bed 12 which heats the incoming air-gas mixture.

Although it is desired that the primary reaction zone be near the top of the primary catalyst bed 12 to effect good heat transfer from the exit gases to the incoming gases, the reaction zone may occur from anywhere above the igniter to the top of the primary bed 12 or even in secondary bed 16. The reaction zone depends upon the reactor size, input and recirculation ratio.

Having described my invention as related to the embodiment shown in the accompanying drawings, it is my intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. A catalytic generator for generating a combustion products atmosphere comprising carbon dioxide, comprising: a closed chamber with an inner wall having a substantially concentrically disposed substantially cylindrical shell formed of heat conducting material disposed therein inwardly of said wall to define a substantially annular space therebetween; inlet means for a fuel-oxygen mixture opening into the lower section of said shell through said closed chamber; catalyst support means in the lower section of said shell; an annular catalyst support means in the lower section of said annular space; a combustion products discharge opening means through said chamber disposed below said annular catalyst support means, said shell having an open upper end; and foraminous closure means in the upper, open end of said shell and in the upper end of said annular space.

2. The generator of claim 1 wherein said foraminous closure means is substantially continuous across said shell upper end and said annular space, and said shell upper end is provided with spaced tongue portions extending through corresponding openings in said foraminous closure means.

References Cited

UNITED STATES PATENTS

| | | | |
|---|---|---|---|
| 3,362,792 | 1/1968 | Ranum | 23—281 |
| 2,472,254 | 6/1949 | Johnson | 23—288 XR |

JAMES H. TAYMAN, *Primary Examiner.*

U.S. Cl. X.R.

23—288.1; 99—189; 431—328